(12) United States Patent
Shieh

(10) Patent No.: US 6,618,331 B2
(45) Date of Patent: Sep. 9, 2003

(54) METHOD AND APPARATUS FOR ACCESSING TARGET DATA IN A DATA STORAGE MEDIUM

(76) Inventor: Jia-Horng Shieh, 5F, 2, Alley 8, Lane 37, Nan-Shan Road, Chung-Ho City, Taipei Hsien (TW)

( * ) Notice: Subject to any disclaimer, the term of this patent is extended or adjusted under 35 U.S.C. 154(b) by 0 days.

(21) Appl. No.: 10/022,156

(22) Filed: Dec. 14, 2001

(65) Prior Publication Data

US 2003/0112715 A1 Jun. 19, 2003

(51) Int. Cl.$^7$ .............................................. G11B 21/08
(52) U.S. Cl. ........................ 369/30.11; 369/30.04; 386/65
(58) Field of Search .................... 369/30.11, 47.28, 369/59.23, 59.25, 44.32, 275.3, 53.34, 53.2, 53.36, 30.04, 30.08, 59.1, 47.4, 47.1, 30.15, 30.22, 30.23; 386/126, 65, 95, 98, 111; 360/77.08, 51, 78.14; 711/112

(56) References Cited

U.S. PATENT DOCUMENTS 6,108,281 A * 8/2000 Tozaki et al. ............ 369/30.04
6,181,660 B1 * 1/2001 Hirayama et al. ......... 369/59.1

* cited by examiner

*Primary Examiner*—Ali Neyzari
(74) *Attorney, Agent, or Firm*—Knobbe, Martens, Olson & Bear LLP

(57) ABSTRACT

In a method and apparatus for accessing target data in a data storage medium, identification data in an initial data sector is verified before a target data sector that corresponds to starting location of the target data in the data storage medium can be found. Therefore, accuracy of the target data can be ensured before decoding of the target data is performed to result in increased efficiency and reduced idle time.

8 Claims, 4 Drawing Sheets

METHOD AND APPARATUS FOR ACCESSING TARGET DATA IN A DATA STORAGE MEDIUM

BACKGROUND OF THE INVENTION

1. Field of the Invention

The invention relates to a method and apparatus for accessing target data in a data storage medium, more particularly to a method and apparatus for facilitating fast and accurate access of target data in a data storage medium.

2. Description of the Related Art

When reading a data sector of an optical disk, it is necessary for an optical drive to verify whether the data sector is indeed the target sector of the optical disk in order to avoid decoding of unwanted data. However, because the header field of a data sector might include some errors that are introduced during stamping of the optical disk or that are due to other factors, and/or because the header field of the target sector might erroneously contain the identification data (ID) of another data sector, the optical drive has to repeat the search for the target sector when an initially-found data sector is deemed to be incorrect after decoding of the latter has begun. Therefore, there is always a need to provide a method and apparatus for facilitating fast and accurate access of target data in data storage mediums.

Referring to FIG. 1, a conventional digital versatile disk (DVD) player 1 is shown to comprise a pick-up head 100, a demodulator 11, a data buffer 12, an error correction code (ECC) decoder 13, a descrambler and error detection code (EDC) checker 14, and an advanced technology attachment packet interface (ATAPI) 15. During data access, when the DVD player 1 searches for a target sector of an optical disk 10, the DVD player 1 initially performs a long-distance search so as to permit fast movement of the pick-up head 100 to the vicinity of the target sector. Thereafter, the DVDplayer 1 performs a short-distance search to locate the target sector. During the short-distance search, data at the vicinity of the target sector (hereinafter referred to as a nearby sector) is read by the pick-up head 100 and is sent to the demodulator 11. The demodulator 11 validates identification data (ID) of the nearby sector against an identification error detection (IED) code of the nearby sector. After successfully validating the identification data of the nearby sector, the pick-up head 100 is enabled to find the target sector by calculating the distance from the nearby sector to the target sector. Once the target sector has been located, data is read in sequence starting from the target sector, and the demodulated data is stored in the data buffer 12 to form an error correction code (ECC) block 16. Aside from a main data portion 161, the ECC block 16 further includes an inner-code parity (PI) 162 and an outer-code parity (PO) 163. The ECC block 16 thus formed in the data buffer 12 is then sent to the ECC decoder 13 for decoding of the data and for finding errors in the accessed data.

In the conventional DVD player 1 of FIG. 1, when the identification data of another data sector erroneously contains that of a target sector (or a nearby sector adjacent to the target sector), and when the error was not detected by the demodulator 11, the DVD player 1 will likely locate an incorrect target sector. Therefore, when the ECC block 16 is sent to the ECC decoder 13 for data decoding, since inner-code parity (PI) and outer-code parity (PO) checking will be performed, detection of the incorrect target sector can be discovered by the ECC decoder 13 so that the search for the target sector can be repeated anew. However, under such circumstances, since the new search for the target sector can only start after the ECC block 16 has formed in the data buffer 12 and the ECC decoder 13 has begun the decoding procedure for the ECC block 16, reduced efficiency and increased idle time result.

SUMMARY OF THE INVENTION

Therefore, the main object of the present invention is to provide a method and apparatus for facilitating fast and accurate access of target data in a data storage medium.

According to one aspect of the invention, there is provided a method for accessing target data in a data storage medium having sequentially arranged data sectors recorded therein. Each of the data sectors contains at least identification data, an identification error detection code and main data. The method comprises:

(a) reading one of the data sectors recorded in the data storage medium;

(b) demodulating said one of the data sectors to generate a block unit that contains the identification data, the identification error detection code and the main data of said one of the data sectors, and that further contains an inner-code parity for the block unit;

(c) verifying accuracy of the identification data in the block unit;

(d) repeating steps (a) , (b) and (c) for a succeeding one of the data sectors of the data storage medium when the identification data in the block unit is found to be inaccurate;

(e) finding a target data sector that corresponds to starting location of the target data in the data storage medium with reference to the block unit having accurate identification data;

(f) reading the data sectors recorded in the data storage medium in sequence starting from the target data sector;

(g) demodulating the data sectors read in step (f) to generate the block units that correspond thereto;

(h) storing the block units generated in step (g) in a data buffer to form a block; and (i) decoding the block formed in the data buffer.

According to another aspect of the invention, there is provided an apparatus for accessing target data in a data storage medium having sequentially arranged data sectors recorded therein. Each of the data sectors contains at least identification data, an identification error detection code and main data. The apparatus comprises:

a pick-up head adapted for reading one of the data sectors recorded in the data storage medium;

a demodulator coupled to the pick-up head and operable so as to demodulate said one of the data sectors to generate a block unit that contains the identification data, the identification error detection code and the main data of said one of the data sectors, and that further contains an inner-code parity for the block unit;

an error correction code decoder coupled to the demodulator and operable so as to verify accuracy of the identification data in the block unit, the error correction code decoder enabling the demodulator to generate the block unit for a succeeding one of the data sectors recorded in the data storage medium when the identification data in the block unit for a current one of the data sectors is found to be inaccurate;

the demodulator being under the control of the error correction code decoder to enable the pick-up head to find a target data sector that corresponds to starting location of the target data in the data storage medium with reference to the block unit having accurate identification data, and to read the data sectors recorded in the data storage medium in sequence starting from the target data sector;

the demodulator demodulating the data sectors from the pick-up head to generate the corresponding block units; and a data buffer coupled to the demodulator for storing the block units generated thereby to form a block in the data buffer;

the error correction code decoder being further coupled to the data buffer and being further operable so as to decode the block formed in the data buffer.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
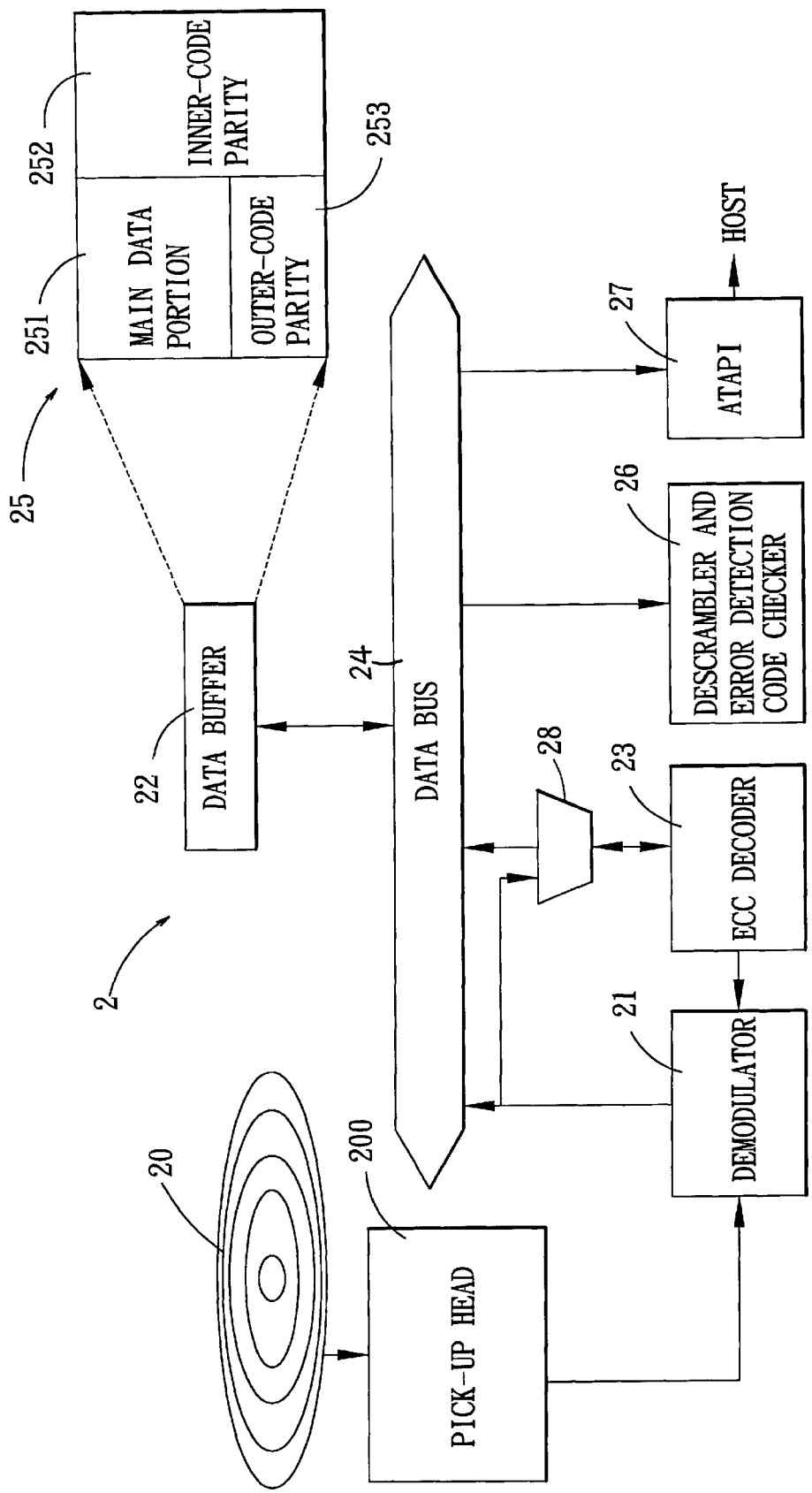
FIG. 2 is a block diagram illustrating a digital versatile disk player that embodies the method and apparatus of this invention.
Figure 3:
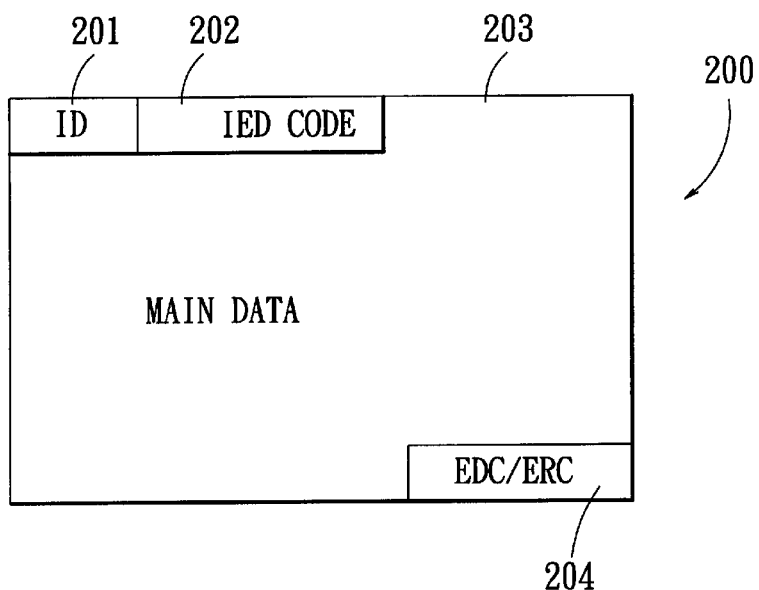
FIG. 3 illustrates a data sector on an optical disk to be read by the preferred embodiment.

Referring to FIG. 2, the method and apparatus of the present invention is suitable for fast and accurate access of target data in a data storage medium 20. The apparatus 2 that embodies the present invention serves as a bridge between the data storage medium 20 and a playback or host terminal (not shown) for reproducing the data recorded in the data storage medium 20. In this embodiment, the apparatus 2 is a digital versatile disk (DVD) player, and the data storage medium 20is an optical disk, such as a compact disk (CD), a video compact disk (VCD), or a digital versatile disk (DVD) . Referring to FIG. 3, in general, the data storage medium 20 has sequentially arranged data sectors 200 recorded therein.

Each data sector 200 contains identification data (ID) 201, an identification error detection (IED) code 202, main data 203, and an error detection code (EDC/CRC) 204. Ideally, the identification data 201 contains a sector code unique to the data sector 200. The IED code 202 is used to validate the identification data 201 to verify the presence of any errors therein.

Referring once again to FIG. 2, the apparatus 2 includes a pick-up head 200, a demodulator 21 coupled to the pick-up head 200, a data buffer 22, an error correction code (ECC) decoder 23, a descrambler and error detection code (EDC) checker 26, an advanced technology attachment packet interface (ATAPI) 27, and a multiplexer 28. When accessing data in the data storage medium 20, the apparatus 2 first has to find a target data sector that corresponds to starting location of the target data in the data storage medium 20. To this end, the apparatus 2 initially performs a long-distance search so as to permit fast movement of the pick-up head 200 to the vicinity of the target data sector. Thereafter, the apparatus 2 performs a short-distance search to find the target data sector. It is noted that the pick-up head 200 may not be properly positioned relative to the target data sector at the start of the short-distance search, and is usually disposed at a nearby data sector within the vicinity of the target data sector. In the present invention, finding of the target data sector proceeds only after the accuracy of identification information of the nearby data sector has been verified.

Figure 5:
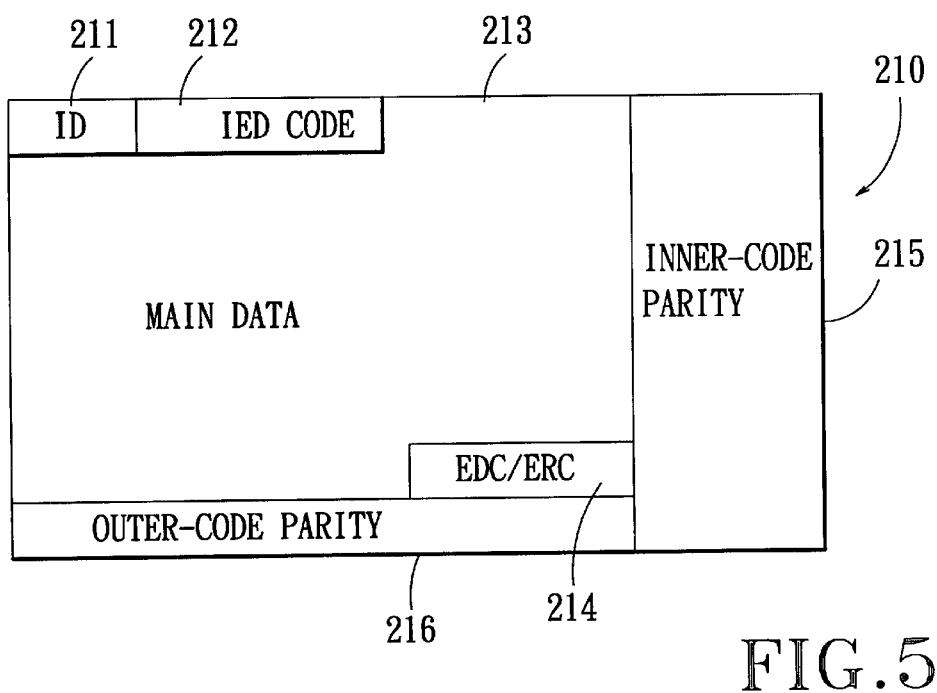
FIG. 5 illustrates an error correction code (ECC) block unit generated by a demodulator of the preferred embodiment.
Figure 4:
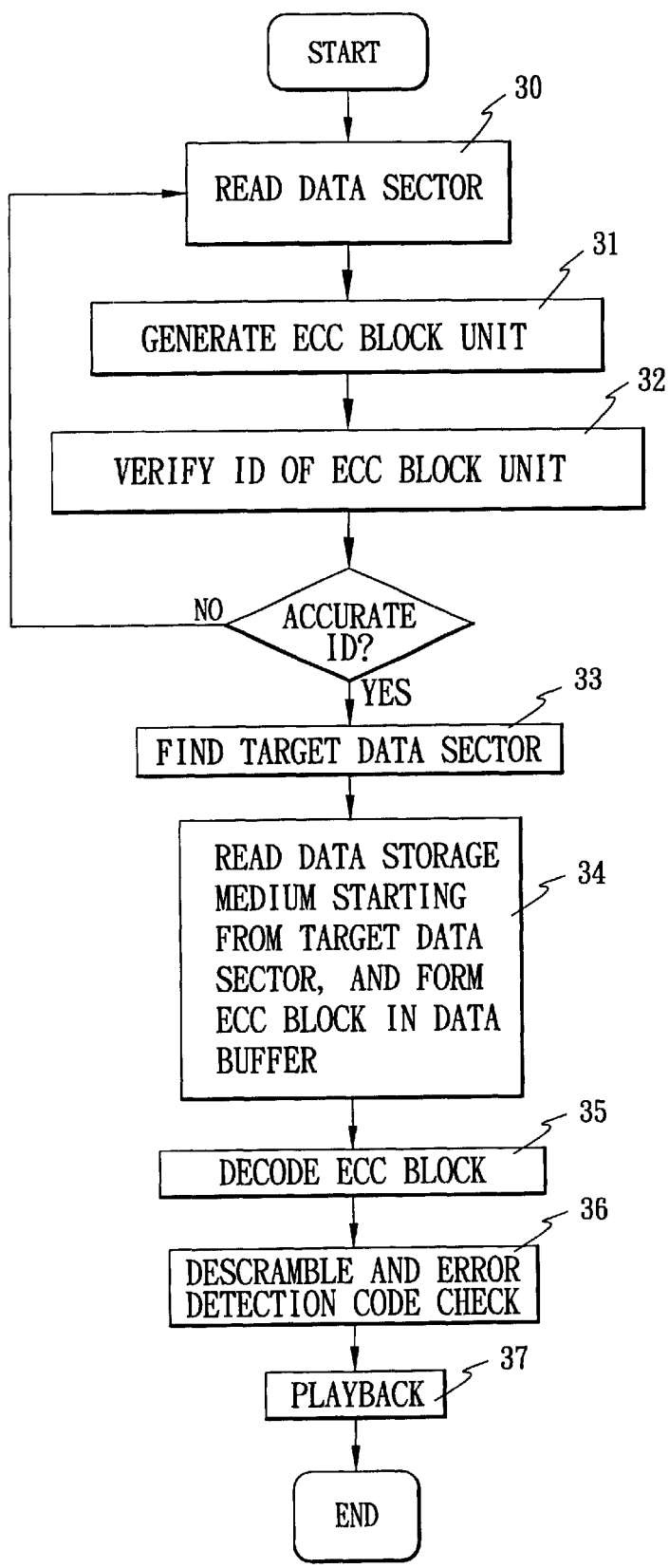
FIG. 4 is a flowchart to illustrate operation of the preferred embodiment.

FIG. 4 is a flowchart to illustrate the steps of the method of the preferred embodiment. Initially, in step 30, when the apparatus 2 begins the short-distance search, the nearby data sector is read by the pick-up head 200 and is provided to the demodulator 21. Thereafter, in step 31, the demodulator 21 demodulates the nearby data sector and generates a corresponding error correction code (ECC) block unit 210. Referring to FIG. 5, aside from identification data (ID) 211, an IED code 212, main data 213 and an error detection code (EDC/CRC) 214 corresponding to those of the nearby data sector, the ECC block unit 210 further contains an inner-code parity (PI) 215 for row parity checking, and an outer-code parity (PO) 216 for column parity checking. The ECC block unit 210 is provided to the data buffer 22 via a data bus 24 and to the ECC decoder 23, simultaneously.

Figure 1:
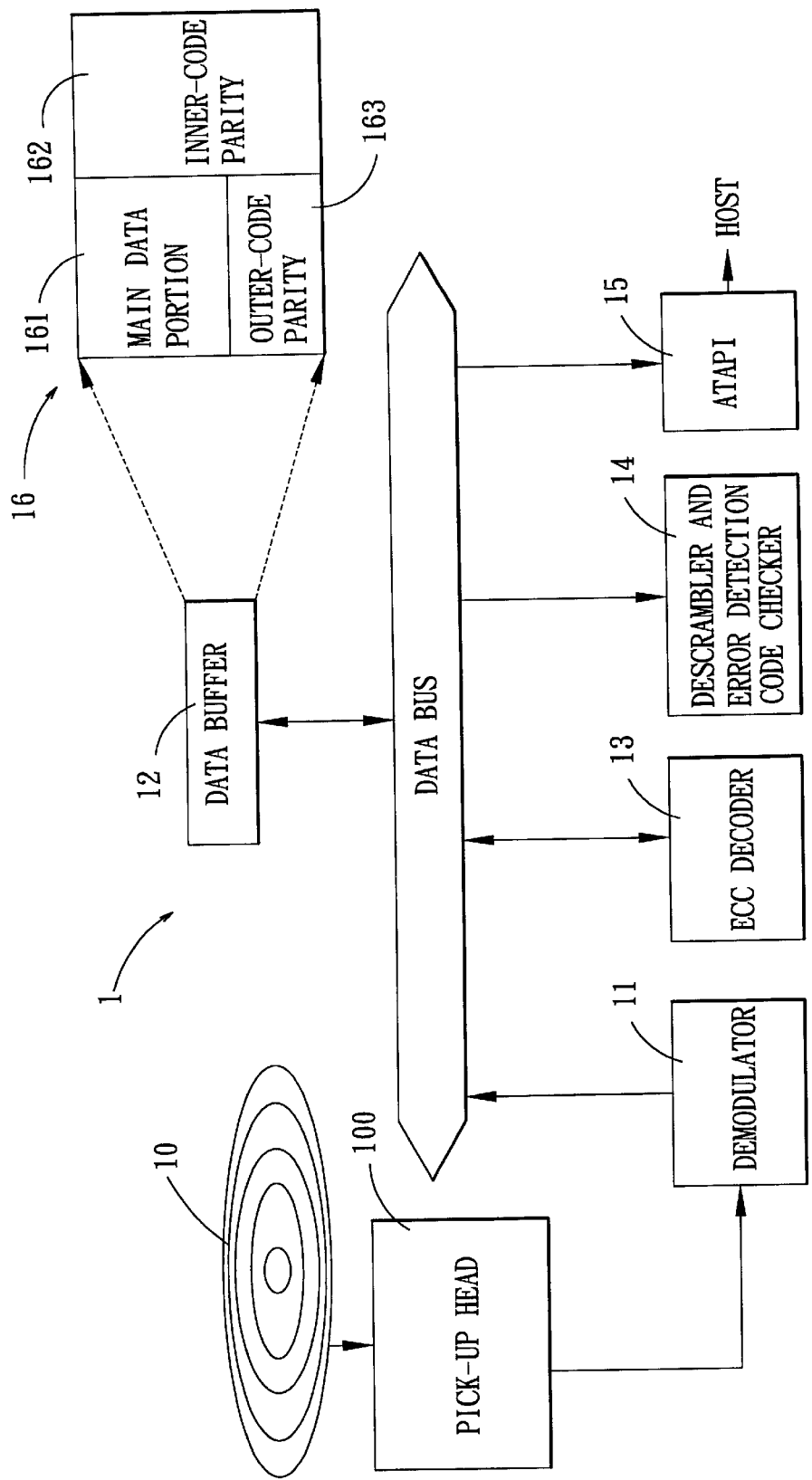
FIG. 1 is a block diagram illustrating a conventional digital versatile disk player.

Subsequently, in step 32, the ECC decoder 23 verifies the accuracy of the identification data (ID) 211 in the ECC block unit 210. In the prior art of FIG. 1, the ECC decoder 13 is used to decode the ECC block 16 from the data buffer 12. During decoding, checking of the inner-code parity 162 and the outer-code parity 163 are performed on the main data portion 161 of the ECC block 16. As such, the ECC decoder 13 of the prior art remains idle until the ECC block 16 is formed in the data buffer 12. In the present invention, because the ECC decoder 23 is used to validate the identification data (ID) 211 of the ECC block unit 210 from the demodulator 21, errors in the identification data (ID) 211 can be detected by the ECC decoder 23 earlier so that decoding of an incorrect ECC block 25 in the data buffer 22 can be avoided to reduce the amount of time required before the search for the correct target data can be resumed. The ECC decoder 23 refers to the IED code 212 and the inner-code parity (PI) 215 to verify the accuracy of the identification data (ID) 211 of the ECC block unit 210. The results are then sent to the demodulator 21.

When verifying the accuracy of the identification data (ID) 211, decoding of a portion of the ECC block unit 210 that contains the identification data (ID) 211 by the ECC decoder 23 will be unsuccessful when the inner-code parity (PI) check fails due to an incorrect identification data (ID) 211. Even if the inner-code parity (PI) check was successful, the identification data (ID) 211 will then be validated against the IED code 212 to further verify the accuracy of the identification data (ID) 211.

In another verification scheme, the IED code 212 is used to decode the identification data (ID) 211. Thereafter, decoding of a portion of the ECC block unit 210 that contains the identification data (ID) 211 by the ECC decoder 23 will be performed for inner-code parity (PI) checking.

If the identification data (ID) 211 of the ECC block unit 210 was deemed to be accurate in step 32, the flow proceeds to step 33. At this time, the target data sector is found with reference to the sector code in the accurate identification data (ID) 211 of the ECC block unit 210. Thereafter, in step 34, the apparatus 2 begins reading the data sectors recorded in the data storage medium 20 starting from the target data sector. The data sectors are demodulated by the demodulator 21 to generate the ECC block units 210 that correspond thereto. The ECC block units 210 are stored in the data buffer 22 via the data bus 24 so as to form the ECC block 25 in the data buffer 22. The ECC block 25 is formed in the data buffer 22 after a predetermined number of the ECC block units 210 have been stored therein. In this embodiment, the ECC block 25 contains up to sixteen ECC block units 210. Thus, as shown in FIG. 2, the ECC block 25 can be generalized to include a main data portion 251, an inner-code parity (PI) portion 252, and an outer-code parity (PO) portion 253.

In the method and apparatus 2 of the preferred embodiment, while the ECC block units 210 are being stored in the data buffer 22 during formation of the ECC block 25, they are simultaneously sent to the ECC decoder 23 for verifying the identification data (ID) 211 of the same. The ECC decoder 23 ceases to verify the identification data (ID) 211 of the ECC block units 210 only upon receipt of the ECC block 25 from the data buffer 22.

Because the data sectors 200 are sequentially arranged in the data storage medium 20, when the identification data (ID) 201 of a target data sector is found to be correct, it is assumed that the identification data (ID) of the succeeding data sectors are also correct. As such, it is not necessary to conduct verification of the identification data (ID) 211 of the ECC block units 210 if the correct target data sector has been found.

Processing of the ECC block 25 formed in the data buffer 22 proceeds in a manner similar to that of the aforementioned prior art. Particularly, in step 35, when the ECC block 25 is formed in the data buffer 22, it is sent to the ECC decoder 23 for data decoding and for correction of errors present in the data. However, because the identification data (ID) 211 of the ECC block units 210 were verified during formation of the ECC block 25 in the data buffer 22, the accuracy of the ECC block 25 can be ensured before decoding of the data is performed by the ECC decoder 23, thereby resulting in increased efficiency and reduced idle time. The decoded ECC block 25 is subsequently sent back to the data buffer 22 by. the ECC decoder 23 via the data bus 24. Thereafter, in step 36, the descrambler and error detection code checker 26 accesses the decoded ECC block 25 from the data buffer 22 via the data bus 24, and performs descrambling and error detection code checking operations thereupon in a known manner. In step 37, descrambled data from the data buffer 22 are provided to the playback or host terminal (not shown) for reproduction via the ATAPI 27.

If the identification data (ID) 211 of the ECC block unit 210 was deemed to be inaccurate in step 32, the flow goes back to steps 30 to 32. Particularly, upon detection by the ECC decoder 23 that an error, e.g. inner-code parity (PI) check failed or IED code validation failed, is present in the identification data (ID) 211 of the ECC block unit 210, the ECC decoder 23 will inform the demodulator 21 accordingly so that validation of the identification data (ID) 211 of a succeeding ECC block unit 210 can begin. Thus, in step 30, the succeeding data sector is read by the pick-up head 200 and is sent to the demodulator 21. Thereafter, instep 31, the demodulator 21 demodulates the succeeding data sector and generates the corresponding ECC block unit 210 that is simultaneously provided to the data buffer 22 and the ECC decoder 23. Because the identification data (ID) 211 of the preceding ECC block unit 210 is inaccurate, the ECC block unit 210 corresponding to the succeeding data sector can be used to overwrite the preceding ECC block unit 210. Then, in step 32, the ECC decoder 23 verifies the identification data (ID) 211 of the ECC block unit 210 for the succeeding data sector. Steps 30 to 32 are repeated until an ECC block unit 210 with accurate identification data (ID) 211 is detected.

In the apparatus 2 of the present invention, the ECC decoder 23 is coupled selectively to the demodulator 21 and the data buffer 22 via the multiplexer 28. As long as the ECC block 25 has yet to be completely formed in the data buffer 22, the multiplexer 28 connects the ECC decoder 23 to the demodulator 21 so that validation of the identification data (ID) 211 of the ECC block units 210 from the demodulator 21 can be accomplished by the ECC decoder 23. Once the ECC block 25 has formed in the data buffer 22, the multiplexer 28 connects the ECC decoder 23 to the data buffer 22 so that decoding of the ECC block 25 can commence in the aforesaid manner. The ECC decoder 23 ceases to receive the ECC block units 210 from the demodulator 21 at this time.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all suchmodifications and equivalent arrangements.

I claim:

1. A method for accessing target data in a data storage medium having sequentially arranged data sectors recorded therein, each of the data sectors containing at least identification data, an identification error detection code and main data, said method comprising:

(a) reading one of the data sectors recorded in the data storage medium;

(b) demodulating said one of the data sectors to generate a block unit that contains the identification data, the identification error detection code and the main data of said one of the data sectors, and that further contains an inner-code parity for the block unit;

(c) verifying accuracy of the identification data in the block unit;

(d) repeating steps (a), (b) and (c) for a succeeding one of the data sectors of the data storage medium when the identification data in the block unit is found to be inaccurate;

(e) finding a target data sector that corresponds to starting location of the target data in the data storage medium with reference to the block unit having accurate identification data;

(f) reading the data sectors recorded in the data storage medium in sequence starting from the target data sector;

(g) demodulating the data sectors read in step (f) to generate the block units that correspond thereto;

(h) storing the block units generated in step (g) in a data buffer to form a block; and (i) decoding the block formed in the data buffer.

2. The method of claim 1, wherein step (a) includes the step of moving a pick-up head for reading a nearby data sector within the vicinity of the target data sector.

3. The method of claim 1, wherein the accuracy of the identification data in the block unit is verified in step (c) by validating the identification data against the identification error detection code, and by performing inner-code parity check upon a portion of the block unit that contains the identification data.

4. The method of claim 1, wherein the data storage medium is an optical disk.

5. An apparatus for accessing target data in a data storage medium having sequentially arranged data sectors recorded therein, each of the data sectors containing at least identification data, an identification error detection code and main data, said apparatus comprising:

a pick-up head adapted for reading one of the data sectors recorded in the data storage medium;

a demodulator coupled to said pick-up head and operable so as to demodulate said one of the data sectors to generate a block unit that contains the identification data, the identification error detection code and the main data of said one of the data sectors, and that further contains an inner-code parity for the block unit;

an error correction code decoder coupled to said demodulator and operable so as to verify accuracy of the identification data in the block unit, said error correction code decoder enabling said demodulator to generate the block unit for a succeeding one of the data sectors recorded in the data storage medium when the identification data in the block unit for a current one of the data sectors is found to be inaccurate;

said demodulator being under the control of said error correction code decoder to enable said pick-up head to find a target data sector that corresponds to starting location of the target data in the data storage medium with reference to the block unit having accurate identification data, and to read the data sectors recorded in the data storage medium in sequence starting from the target data sector;

said demodulator demodulating the data sectors from said pick-up head to generate the corresponding block units; and a data buffer coupled to said demodulator for storing the block units generated thereby to form a block in said data buffer;

said error correction code decoder being further coupled to said data buffer and being further operable so as to decode the block formed in said data buffer.

6. The apparatus of claim 5, wherein said error correction code decoder is operable so as to validate the identification data against the identification error detection code, and so as to perform inner-code parity check upon a portion of the block unit that contains the identification data in order to verify the accuracy of the identification data in the block unit.

7. The apparatus of claim 5, further comprising a multiplexer for coupling said error correction code decoder to said demodulator and said data buffer, said multiplexer being capable of making connection between said demodulator and said error correction code decoder and breaking connection between said data buffer and said error correction code decoder as long as said block has yet to be completely formed in said data buffer.

8. The apparatus of claim 5, wherein the data storage medium is an optical disk.

* * * * *